United States Patent Office.

ANTHONY J. HINDEMEYER, OF PHILADELPHIA, PENNSYLVANIA, ASSIGNOR TO SAMUEL C. COLLINS, OF SAME PLACE.

Letters Patent No. 108,138, dated October 11, 1870.

IMPROVEMENT IN COMPOSITIONS FOR WELDING, PUDDLING, AND BRAZING METALS.

The Schedule referred to in these Letters Patent and making part of the same.

*To all whom it may concern:*

Be it known that I, ANTHONY J. HINDEMEYER, of the city and county of Philadelphia, in the State of Pennsylvania, have invented a new and useful "Flux for Welding, Puddling, and Brazing Metals;" and I do hereby declare the following to be a full, clear, and exact description of the same.

My present invention is an improvement upon the flux for welding and brazing for which patents were granted to me on the 30th of October and 18th of December, 1866, and numbered respectively 59,222 and 60,516.

My invention consists in combining, with the flux described in the above-named patents, common table-salt and sal-soda or potash.

I take fourteen ounces of the oyster-shells and chalcedony quartz, which have been previously powdered and mixed, as specified in patent No. 60,516. I then add one ounce each of common salt and sal-soda or potash, all of which must be finely powdered and well mixed.

In this condition the compound may be applied as a flux, in the ordinary manner well known to every blacksmith and practical metallurgist.

The sal-soda and salt cleans the metal more effectually, and forms, with the oyster-shells and chalcedony quartz, silica, or silver sand, an improved flux for welding steel to steel, or steel to iron.

It also operates as a physic, for cleansing and improving the quality of iron, in the operation of puddling.

What I claim as my invention, and desire to secure by Letters Patent, is—

The compound, substantially as herein described, as a flux for welding or brazing iron and steel, and for cleansing and purifying iron in the process of puddling.

A. J. HINDEMEYER.

Witnesses:
K. H. JONES,
ANDREW J. BOSWELL.